(12) United States Patent
Li et al.

(10) Patent No.: US 12,537,430 B2
(45) Date of Patent: Jan. 27, 2026

(54) ENERGY STORAGE SYSTEM AND BLACK START METHOD

(71) Applicant: Huawei Digital Power Technologies Co., Ltd., Shenzhen (CN)

(72) Inventors: Lin Li, Shanghai (CN); Zhipeng Wu, Shenzhen (CN); Yanzhong Zhang, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 187 days.

(21) Appl. No.: 18/456,205

(22) Filed: Aug. 25, 2023

(65) Prior Publication Data

US 2024/0006886 A1 Jan. 4, 2024

Related U.S. Application Data

(63) Continuation of application No. PCT/CN2022/076013, filed on Feb. 11, 2022.

(30) Foreign Application Priority Data

Feb. 27, 2021 (CN) .......................... 202110223426.3

(51) Int. Cl.
*H02M 1/36* (2007.01)
*H02J 3/38* (2006.01)
(Continued)

(52) U.S. Cl.
CPC ........... *H02M 1/0006* (2021.05); *H02J 3/388* (2020.01); *H02J 3/472* (2020.01); *H02M 1/36* (2013.01); *H02J 2207/10* (2020.01)

(58) Field of Classification Search
CPC ........ H02J 2207/10; H02J 3/472; H02J 3/388; H02M 1/36; H02M 1/0006
See application file for complete search history.

(56) References Cited

U.S. PATENT DOCUMENTS

| 2007/0240000 | A1 | 10/2007 | Chapuis et al. | |
| 2013/0088900 | A1* | 4/2013 | Park | H02J 3/32 |
| | | | | 363/71 |
| 2018/0248378 | A1 | 8/2018 | Ren | |

FOREIGN PATENT DOCUMENTS

| CN | 204668965 U | * | 9/2015 |
| CN | 105490392 A | | 4/2016 |

(Continued)

OTHER PUBLICATIONS

Machine translation of CN 210380372-U by Clarivate Ananlytics, Jun. 2025, 6 pages.*

(Continued)

*Primary Examiner* — Harry R Behm
(74) *Attorney, Agent, or Firm* — Slater Matsil, LLP

(57) ABSTRACT

Embodiments of this application provide an energy storage system and a black start method. The energy storage system includes a black start controller, a battery module, a first converter, and a system control unit. The black start controller outputs a black start signal, the battery module generates an output voltage based on the black start signal, and the first converter supplies power to the system control unit based on the black start signal and the output voltage of the battery module, to enable the system control unit to implement black start of the energy storage system based on the black start signal.

20 Claims, 4 Drawing Sheets

(51) Int. Cl.
*H02J 3/46* (2006.01)
*H02M 1/00* (2006.01)

(56) References Cited

FOREIGN PATENT DOCUMENTS

| | | | |
|---|---|---|---|
| CN | 109004706 A | | 12/2018 |
| CN | 109066799 A | | 12/2018 |
| CN | 208539579 U | | 2/2019 |
| CN | 210380372 U | * | 4/2020 |
| CN | 111130102 A | | 5/2020 |
| CN | 111416386 A | | 7/2020 |
| CN | 211908651 U | | 11/2020 |
| CN | 112039100 A | | 12/2020 |

OTHER PUBLICATIONS

Machine translation of CN 204668965-U by Clarivate Ananlytics, Jun. 2025, 7 pages.*

* cited by examiner

ENERGY STORAGE SYSTEM AND BLACK START METHOD

CROSS-REFERENCE TO RELATED APPLICATIONS

This application is a continuation of International Application No. PCT/CN2022/076013, filed on Feb. 11, 2022, which claims priority to Chinese Patent Application No. 202110223426.3, filed on Feb. 27, 2021. The disclosures of the aforementioned applications are hereby incorporated by reference in their entireties.

TECHNICAL FIELD

This application relates to the field of circuit technologies, and in particular, to an energy storage system and a black start method.

BACKGROUND

Black start means that after an entire system is shut down because of a fault, without relying on any help of another network, generating units with an automatic startup capability in the system are started to drive generating units without an automatic startup capability, so that a recovery scope of the system is gradually expanded, and the entire system is finally recovered.

During initial installation of an energy storage system, the energy storage system is in an off-grid mode and may not be powered by an alternating current or an alternating current power grid. In this case, a battery module in the energy storage system needs to supply a voltage to a local load to support operation of the load. Generally, the battery module is triggered by using a black start solution, and black start of the system is implemented by using an uninterruptible power supply (UPS). However, costs of the UPS are high, and the UPS needs to occupy some energy storage space during the use, resulting in a decrease in energy density of the energy storage system. In addition, a service life of the UPS is shorter than that of the energy storage system. Consequently, the UPS needs to be replaced during the use of the energy storage system. Therefore, how to perform black start in the off-grid mode is a technical problem to be solved by a person skilled in the art.

SUMMARY

Embodiments of this application disclose an energy storage system and a black start method, to improve efficiency of obtaining a black start signal by a system control unit, and increase a success rate of black start.

According to a first aspect, an embodiment of this application provides an energy storage system, including:
  a black start controller, configured to output a black start signal;
  a battery module whose input port is connected to an output port of the black start controller, configured to generate an output voltage based on the black start signal; and
  a first converter whose input port is connected to an output port of the battery module and the output port of the black start controller, configured to supply, based on the black start signal and the output voltage of the battery module, power to a system control unit whose input port is connected to an output port of the first converter, to enable the system control unit to implement black start of the energy storage system based on the black start signal.

It may be understood that, after the black start controller outputs the black start signal, the battery module whose input port is connected to the output port of the black start controller may generate the output voltage based on the black start signal, and the first converter whose input port is connected to the output port of the battery module may be started based on the output voltage generated by the battery module, to output the output voltage of the first converter, so that the system control unit whose input port is connected to the output port of the first converter may be started based on the output voltage of the first converter, to supply the power to the system control unit. In addition, after receiving the black start signal, the first converter may control the system control unit to implement black start of the energy storage system. In this way, efficiency of obtaining the black start signal by the system control unit is improved, and a success rate of the black start is increased.

In a possible implementation, the energy storage system further includes at least two power conversion systems, a load connected in parallel to the at least two power conversion systems, and a second converter whose input port is connected to the output port of the battery module and whose output port is connected to an input port of the power conversion system through at least one direct current bus, where
  the system control unit is configured to separately send a power-on instruction to the second converter and the power conversion system;
  the second converter is configured to establish a bus voltage based on the power-on instruction and the output voltage of the battery module; and
  the power conversion system is configured to supply power to the load based on the power-on instruction and the bus voltage.

It may be understood that after the first converter provides the voltage for the system control unit based on the black start signal output by the black start controller and the output voltage generated by the battery module, the system control unit may separately send the power-on instruction to the second converter and the power conversion system, so that the second converter establishes, based on the power-on instruction and the output voltage generated by the battery module, the bus voltage used to supply the power to the system, to provide the bus voltage for the power conversion system, and then the power conversion system supplies power to the load based on the power-on instruction and the bus voltage, thereby implementing black start of the energy storage system.

In a possible implementation, the power conversion system includes a primary power conversion system and at least one secondary power conversion system, where
  the primary power conversion system is configured to supply, in response to meeting a first preset condition, the power to the load based on the power-on instruction and the bus voltage; and
  the secondary power conversion system is configured to supply, in response to meeting a second preset condition, the power to the load based on the power-on instruction, the bus voltage, and an output voltage of the load.

It may be understood that, when the first preset condition is met, the primary power conversion system supplies power to the load based on the power-on instruction and the bus voltage, and then when the second preset condition is met, the secondary power conversion system supplies power to the load based on the power-on instruction, the bus voltage, and the output voltage of the load. In this way, a black start failure caused by an excessively large current of the load that is caused when all power conversion systems in the energy storage system are simultaneously started to supply the power to the load is avoided, and a success rate of the black start is increased.

In a possible implementation, the meeting a first preset condition includes that the bus voltage meets a power-on condition, the energy storage system is in an off-grid mode, and the load has no output voltage.

It may be understood that when the bus voltage meets the power-on condition, the power conversion system may be supported to supply the power to the load based on the bus voltage. If the energy storage system is in the off-grid mode and the load has no output voltage, it indicates that the load needs to be powered. Therefore, when the first preset condition is met, the primary power conversion system may supply the power to the load based on the power-on instruction and the bus voltage, thereby improving accuracy of black start, and increasing a success rate of the black start.

In a possible implementation, the meeting a second preset condition includes that the bus voltage meets a power-on condition, the energy storage system is in an off-grid mode, and the output voltage of the load reaches a target value.

The target value may be a preset threshold, for example, 220 V. The target value may alternatively be a preset range, for example, 220 V±10%.

It may be understood that when the bus voltage meets the power-on condition, the power conversion system may be supported to supply the power to the load based on the bus voltage. However, when the energy storage system is in the off-grid mode, and the output voltage of the load reaches the target value, it indicates that the load stably runs, and may be connected to the secondary power conversion system, to supply the power to the load. That is, when the second preset condition is met, the secondary power conversion system may supply the power to the load based on the power-on instruction, the bus voltage, and the output voltage of the load, thereby improving accuracy of black start, and increasing a success rate of the black start.

In a possible implementation, the energy storage system further includes a first relay whose input port is connected to an output port of the primary power conversion system and whose output port is connected to an input port of the load, and the primary power conversion system is specifically configured to: generate an output voltage based on the power-on instruction and the bus voltage; and in response to that the output voltage of the primary power conversion system reaches a target value, close the first relay, to supply the power to the load.

It may be understood that, after receiving the power-on instruction, the primary power conversion system may generate the output voltage based on the bus voltage, that is, perform power conversion on a direct current voltage, to obtain an alternating current voltage with a preset frequency and amplitude required by the load. When the amplitude of the alternating current voltage reaches the target value, it indicates that the primary power conversion system generates the alternating current voltage that meets a preset requirement, and closes the first relay, to supply the power to the load, thereby improving running stability of the load.

In a possible implementation, the energy storage system further includes a second relay whose input port is connected to an output port of the secondary power conversion system and whose output port is connected to an input port of the load, and the secondary power conversion system is specifically configured to: generate an output voltage based on the power-on instruction and the bus voltage; perform phase-lock processing on the output voltage generated by the secondary power conversion system and the output voltage of the load; and in response to that a difference between the output voltage of the secondary power conversion system and the output voltage of the load is less than a preset threshold, close the second relay, to supply the power to the load.

The preset threshold is not limited, and may be 10%, 0.5, or the like.

It may be understood that, after the primary power conversion system first supplies power to the load, the load has the output voltage, and then the secondary power conversion system supplies power to the load based on the received power-on instruction. In this way, a failure of power supply to the load caused by an excessively large current of the load that is caused when all power conversion systems are simultaneously started to supply the power to the load may be avoided. In addition, the secondary power conversion system specifically generates the output voltage based on the bus voltage, and performs phase-lock processing on the output voltage of the load, to obtain an output voltage that is in a same phase as the output voltage of the load. When the difference between the output voltage of the secondary power conversion system and the output voltage of the load is less than the preset threshold, it indicates that the secondary power conversion system may generate an alternating current voltage synchronized with the output voltage of the load and close the second relay, to supply the power to the load, thereby further improving running stability of the load.

According to a second aspect, an embodiment of this application further provides a black start method, applied to an energy storage system. The energy storage system includes a black start controller, a battery module, a first converter, and a system control unit. The black start controller outputs a black start signal, the battery module generates an output voltage based on the black start signal, and the first converter supplies power to the system control unit based on the black start signal and the output voltage of the battery module, to enable the system control unit to implement black start of the energy storage system based on the black start signal.

It may be understood that, after the black start controller outputs the black start signal, the battery module may generate the output voltage based on the black start signal, and the first converter may provide the voltage for the system control unit based on the black start signal output by the black start controller and the output voltage generated by the battery module, to enable the system control unit to implement black start of the energy storage system based on the black start signal. In this way, efficiency of obtaining the black start signal by the system control unit is improved, and a success rate of the black start is increased.

In a possible implementation, the energy storage system further includes at least two power conversion systems, a load, and a second converter. The black start method further includes: separately sending, by the system control unit, a power-on instruction to the second converter and the power conversion system; establishing, by the second converter, a bus voltage based on the power-on instruction and the output voltage of the battery module; and supplying, by the power conversion system, power to the load based on the power-on instruction and the bus voltage.

It may be understood that after the first converter provides the voltage for the system control unit based on the black start signal output by the black start controller and the output voltage generated by the battery module, the system control unit may separately send the power-on instruction to the second converter and the power conversion system, so that the second converter establishes, based on the power-on instruction and the output voltage generated by the battery module, the bus voltage used to supply the power to the system, to provide the bus voltage for the power conversion system, and then the power conversion system supplies power to the load based on the power-on instruction and the bus voltage, thereby implementing black start of the energy storage system.

In a possible implementation, the power conversion system includes a primary power conversion system and at least one secondary power conversion system. That the power conversion system supplies the power to the load based on the power-on instruction and the bus voltage includes: The primary power conversion system supplies, in response to meeting a first preset condition, the power to the load based on the power-on instruction and the bus voltage; and the secondary power conversion system supplies, in response to meeting a second preset condition, the power to the load based on the power-on instruction, the bus voltage, and an output voltage of the load.

It may be understood that, when the first preset condition is met, the primary power conversion system supplies power to the load based on the power-on instruction and the bus voltage, and then when the second preset condition is met, the secondary power conversion system supplies power to the load based on the power-on instruction, the bus voltage, and the output voltage of the load. In this way, a black start failure caused by an excessively large current of the load that is caused when all power conversion systems in the energy storage system are simultaneously started to supply the power to the load is avoided, and a success rate of the black start is increased.

In a possible implementation, the meeting a first preset condition includes that the bus voltage meets a power-on condition, the energy storage system is in an off-grid mode, and the load has no output voltage.

It may be understood that when the bus voltage meets the power-on condition, the power conversion system may be supported to supply the power to the load based on the bus voltage. If the energy storage system is in the off-grid mode and the load has no output voltage, it indicates that the load needs to be powered. Therefore, when the first preset condition is met, the primary power conversion system may supply the power to the load based on the power-on instruction and the bus voltage, thereby improving accuracy of black start, and increasing a success rate of the black start.

In a possible implementation, the meeting a second preset condition includes that the bus voltage meets a power-on condition, the energy storage system is in an off-grid mode, and the output voltage of the load reaches a target value.

The target value may be a preset threshold, for example, 220 V. The target value may alternatively be a preset range, for example, 220 V±10%.

It may be understood that when the bus voltage meets the power-on condition, the power conversion system may be supported to supply the power to the load based on the bus voltage. However, when the energy storage system is in the off-grid mode, and the output voltage of the load reaches the target value, it indicates that the load stably runs, and may be connected to the secondary power conversion system, to supply the power to the load. That is, when the second preset condition is met, the secondary power conversion system may supply the power to the load based on the power-on instruction, the bus voltage, and the output voltage of the load, thereby improving accuracy of black start, and increasing a success rate of the black start.

In a possible implementation, the energy storage system further includes a first relay. That the primary power conversion system supplies the power to the load based on the power-on instruction and the bus voltage includes: The primary power conversion system generates an output voltage based on the power-on instruction and the bus voltage; and in response to that the output voltage of the primary power conversion system reaches a target value, the primary power conversion system closes the first relay, to supply the power to the load.

It may be understood that, after receiving the power-on instruction, the primary power conversion system may generate the output voltage based on the bus voltage, that is, perform power conversion on a direct current voltage, to obtain an alternating current voltage with a preset frequency and amplitude required by the load. When the amplitude of the alternating current voltage reaches the target value, it indicates that the primary power conversion system generates the alternating current voltage that meets a preset requirement, and closes the first relay, to supply the power to the load, thereby improving running stability of the load.

In a possible implementation, that the secondary power conversion system supplies the power to the load based on the power-on instruction, the bus voltage, and an output voltage of the load includes: The secondary power conversion system generates an output voltage based on the power-on instruction and the bus voltage; the secondary power conversion system performs phase-locking processing on the output voltage of the secondary power conversion system and the output voltage of the load; and in response to that a difference between the output voltage of the secondary power conversion system and the output voltage of the load is less than a preset threshold, the secondary power conversion system supplies the power to the load.

The preset threshold is not limited, and may be 10%, 0.5, or the like.

It may be understood that, after the primary power conversion system first supplies power to the load, the load has the output voltage, and then the secondary power conversion system supplies power to the load based on the received power-on instruction. In this way, a failure of power supply to the load caused by an excessively large current of the load that is caused when all power conversion systems are simultaneously started to supply the power to the load may be avoided. In addition, the secondary power conversion system specifically generates the output voltage based on the bus voltage, and performs phase-lock processing on the output voltage of the load, to obtain an output voltage that is in a same phase as the output voltage of the load. When the difference between the output voltage of the secondary power conversion system and the output voltage of the load is less than the preset threshold, it indicates that the secondary power conversion system may generate an alternating current voltage synchronized with the output voltage of the load and close the second relay, to supply the power to the load, thereby further improving running stability of the load.

According to a third aspect, an embodiment of the present invention further provides a chip system. The chip system includes at least one processor, a memory, and a transceiver. The memory, the transceiver, and the at least one processor are interconnected by using a line, the at least one memory stores an instruction, and when the instruction is executed by the processor, the method according to the second aspect is performed.

According to a fourth aspect, an embodiment of the present invention further provides a computer-readable storage medium. The computer-readable storage medium stores an instruction, and when the instruction is run on a network device, the method according to the second aspect is performed.

According to a fifth aspect, an embodiment of the present invention further provides a computer program product. When the computer program product runs on a terminal, the method according to the second aspect is performed.

BRIEF DESCRIPTION OF THE DRAWINGS

The following describes accompanying drawings used in embodiments of this application.

DETAILED DESCRIPTION OF ILLUSTRATIVE EMBODIMENTS

This application provides an energy storage system, which may be applied to a microgrid, a diesel fuel power supply area, photovoltaic power generation, wind power generation, a renewable energy, or used in a large-scale scenario, small- and medium-scale distributed scenario, microgrid scenario, or user side scenario. This is not limited herein. The following describes embodiments of this application with reference to the accompanying drawings in embodiments of this application.

Figure 1:
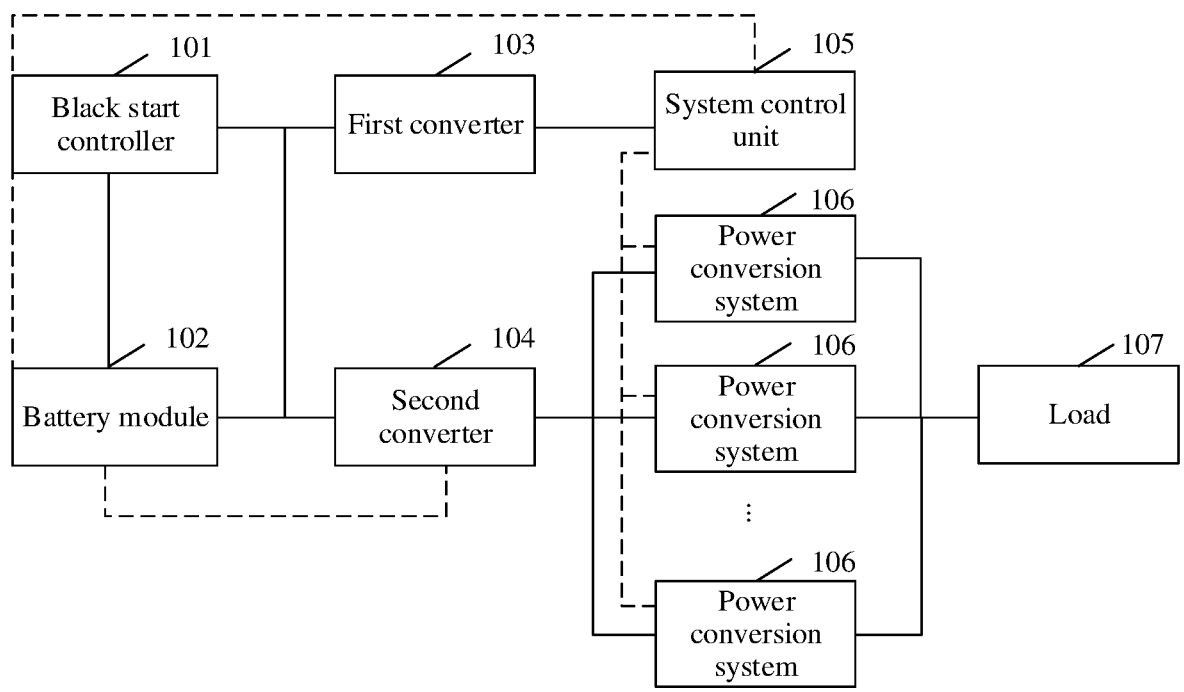
FIG. 1 is a schematic structural diagram of an energy storage system according to an embodiment of this application.

FIG. 1 is a schematic structural diagram of an energy storage system according to an embodiment of this application. As shown in FIG. 1, the energy storage system 10 includes a black start controller 101, a battery module 102, a first converter 103, a second converter 104, a system control unit (SCU) 105, at least two power conversion systems (PCS) 106, and a load 107. The PCS may also be referred to as an energy conversion system, an energy converter, a power inverter, or the like, and is a converter that converts a received direct current voltage (for example, a charge transmitted by a battery, a battery cell, or the like) into a constant-frequency constant-voltage or frequency-modulated alternating current. In this embodiment of this application, the power conversion system is used for description.

A solid line in FIG. 1 represents a power cable, that is, two nodes connected by the solid line may be used for transmitting a charge, to implement circuit connection. In other words, the black start controller 101 is connected to the battery module 102 and the first converter 103 through a power cable, and the battery module 102 is further connected to the second converter 104 through a power cable. The second converter 104 is connected to at least two PCSs 106 connected in parallel through a power cable, each PCS 106 is connected to the load 107 through a power cable, a power cable between the second converter 104 and the PCS 106 is referred to as a direct current bus, and a power cable between the PCS 106 and the load 107 is referred to as an alternating current bus. It should be noted that, there may be one or more direct current buses between the second converter 104 and the PCS 106.

When the energy storage system 10 is in an off-grid mode, an output port of the black start controller 101 is connected to an input port of the battery module 102 and an input port of the first converter 103, and the black start controller 101 may separately transmit a black start signal to the battery module 102 and the first converter 103. An output port of the battery module 102 is connected to an input port of the first converter 103 and an input port of the second converter 104, and the battery module 102 may separately supply power to the first converter 103 and the second converter 104. An output port of the first converter 103 is connected to an input port of the SCU 105, and the first converter 103 may supply power to the SCU 105. An output port of the second converter 104 is connected to an input port of the PCS 106, and the second converter 104 may supply power to the PCS 106. An output port of the PCS 106 is connected to an input port of the load 107, and the PCS 106 may supply power to the load 107. It should be noted that, when the energy storage system 10 is in a grid-connected mode, the PCS 106 may further supply the power to the load 107.

A dashed line in FIG. 1 represents a communication cable, that is, two nodes connected by the dashed line may implement signal transmission through communication. In other words, the battery module 102 is connected to the second converter 104 and the SCU 105 through a power cable, and the SCU 105 is further connected to the PCS 106 through a power cable. When the energy storage system 10 is in an off-grid mode, the SCU 105 may send an instruction to the second converter 104 and the PCS 106. The instruction may be an instruction used to instruct the second converter 104 and the PCS 106 to be powered on, or may be another instruction or the like. This is not limited herein.

The communication cable in embodiments of this application may be an industry standard architecture (ISA) bus, a peripheral component interconnect (PCI) bus, an extended industry standard architecture (EISA) bus, or the like. The communication cable may be classified into an address bus, a data bus, a control bus, and the like, for example, a 485 bus.

The black start controller 101, the battery module 102, the first converter 103, and the second converter 104 may be integrated into an energy storage container, and serve as an energy storage system to supply electric energy to the PCS 106. It should be noted that there may be one or more energy storage containers in the energy storage system 10.

In this embodiment of this application, the black start controller 101 is configured to output a black start signal. The black start signal is used to indicate to implement the black start method according to this embodiment of this application. The black start signal may be an instruction or a charge state. The black start controller 101 may be a switch. A state of the switch is set to switch the output voltage of the black start controller 101 from a low level to a high level. For example, when the state of the switch is disabled, the black start controller 101 may switch to a high level, so that the battery module 102 and the first converter 103 that are connected to the black start controller 101 can learn that the black start controller 101 outputs the black start signal. A control method of the black start controller 101 is not limited in this application, and may be actively controlled by a person, or may be a received power-on instruction sent by the SCU 105. The power-on instruction may be an instruction sent by a person and received by the SCU 105, or an instruction generated when the energy storage system 10 is in an off-grid mode based on an alternating current voltage on the PCS 106 side or an alternating current voltage of the load 107. This is not limited herein.

The battery module 102 is configured to generate an output voltage based on the black start signal, that is, provide a direct current voltage on a power generation side of the energy storage system 10. The battery module 102 (not shown in the figure) may include a battery, which may be a battery pack or a whole battery pack including a plurality of cells connected in series, a photovoltaic string, or the like. This is not limited herein. The battery module 102 may further include a battery control unit (Battery Control Unit, BCU) connected to the battery, and the like. The BCU may be configured to monitor a battery and measure related data of the battery. The related data may be data such as a current signal, a voltage signal, an operating temperature, a charge state, and a state of health in the battery. This is not limited herein. The BCU performs, based on related data obtained through measurement, alarm reporting and emergency protection processing on a fault that may occur in the battery module 102, to perform optimized control on running of the battery module 102, and ensure safe, reliable, and stable running of the battery module 102. The battery may generate an output voltage based on the black start signal, or the battery may generate an output voltage based on an instruction transmitted by the BCU, or the like. The instruction transmitted by the BCU may be an instruction sent by the SCU 105, an instruction generated based on the measurement of related data of the battery, or the like. This is not limited herein.

The first converter 103 is configured to supply power to the SCU 105 based on the output voltage generated by the battery module 102. The first converter 103 may be a DC/DC converter, a DC/AC converter, or the like. This is not limited herein. The first converter 103 is specifically configured to convert the output voltage (direct current) generated by the battery module 102 into a voltage that meets a voltage form required by the SCU 105. When the voltage required by the SCU 105 is an alternating current voltage, the first converter 103 may be a DC/AC converter. When the voltage required by the SCU 105 is a direct current voltage, the first converter 103 may be a DC/DC converter.

In this embodiment of this application, the DC/DC converter may include at least one of the following: a boost DC/DC converter, a buck DC/DC converter, and a buck-boost DC/DC converter. The DC/DC converter may adopt an existing structure. To be specific, the DC/DC converter is formed by a first H-bridge rectifier circuit and a second H-bridge rectifier circuit. A first bridge arm of the first H-bridge rectifier circuit is used as a first direct current port of the DC/DC converter, and a second bridge arm of the second H-bridge rectifier circuit is used as a second direct current port of the DC/DC converter, to implement direct current voltage conversion. The DC/AC converter converts a direct current into an alternating current, and includes an independent rack or a single inverter, a parallel inverter, and the like. This is not limited herein.

It may be understood that, after the black start controller 101 outputs the black start signal, the battery module 102 whose input port is connected to the output port of the black start controller 101 may generate the output voltage based on the black start signal, and the first converter 103 whose input port is connected to the output port of the battery module 102 may be started based on the output voltage generated by the battery module 102, to output the output voltage of the first converter 103, so that the SCU 105 whose input port is connected to the output port of the first converter 103 may be started based on the output voltage of the first converter 103, to supply the power to the SCU 105. In addition, after receiving the black start signal, the first converter 103 may control the SCU 105 to implement black start of the energy storage system. In this way, efficiency of obtaining the black start signal by the SCU 105 is improved, and a success rate of the black start is increased. It should be noted that the SCU 105 may further debug the energy storage system 10 based on the output voltage of the first converter 103.

In a possible example, the SCU 105 is configured to separately send a power-on instruction to the second converter 104 and the PCS 106. The second converter 104 is configured to establish a bus voltage based on the power-on instruction and the output voltage generated by the battery module 102. The PCS 106 is configured to supply power to the load 107 based on the power-on instruction and the bus voltage.

The power-on instruction is used to indicate the second converter 104 and the PCS 106 to perform black start. The second converter 104 may be a DC/DC converter, and is specifically configured to convert the output voltage (direct current) generated by the battery module 102 into a voltage (direct current) that meets a voltage form required by the PCS 106.

It may be understood that after the first converter 103 provides the voltage for the SCU 105 based on the black start signal output by the black start controller 101 and the output voltage generated by the battery module 102, the SCU 105 may separately send the power-on instruction to the second converter 104 and the PCS 106, so that the second converter 104 establishes, based on the power-on instruction and the output voltage generated by the battery module 102, the bus voltage used to supply the power to the system, to provide the bus voltage for the PCS 106, and then the PCS 106 supplies power to the load 107 based on the power-on instruction and the bus voltage, thereby implementing black start of the energy storage system.

Figure 2:
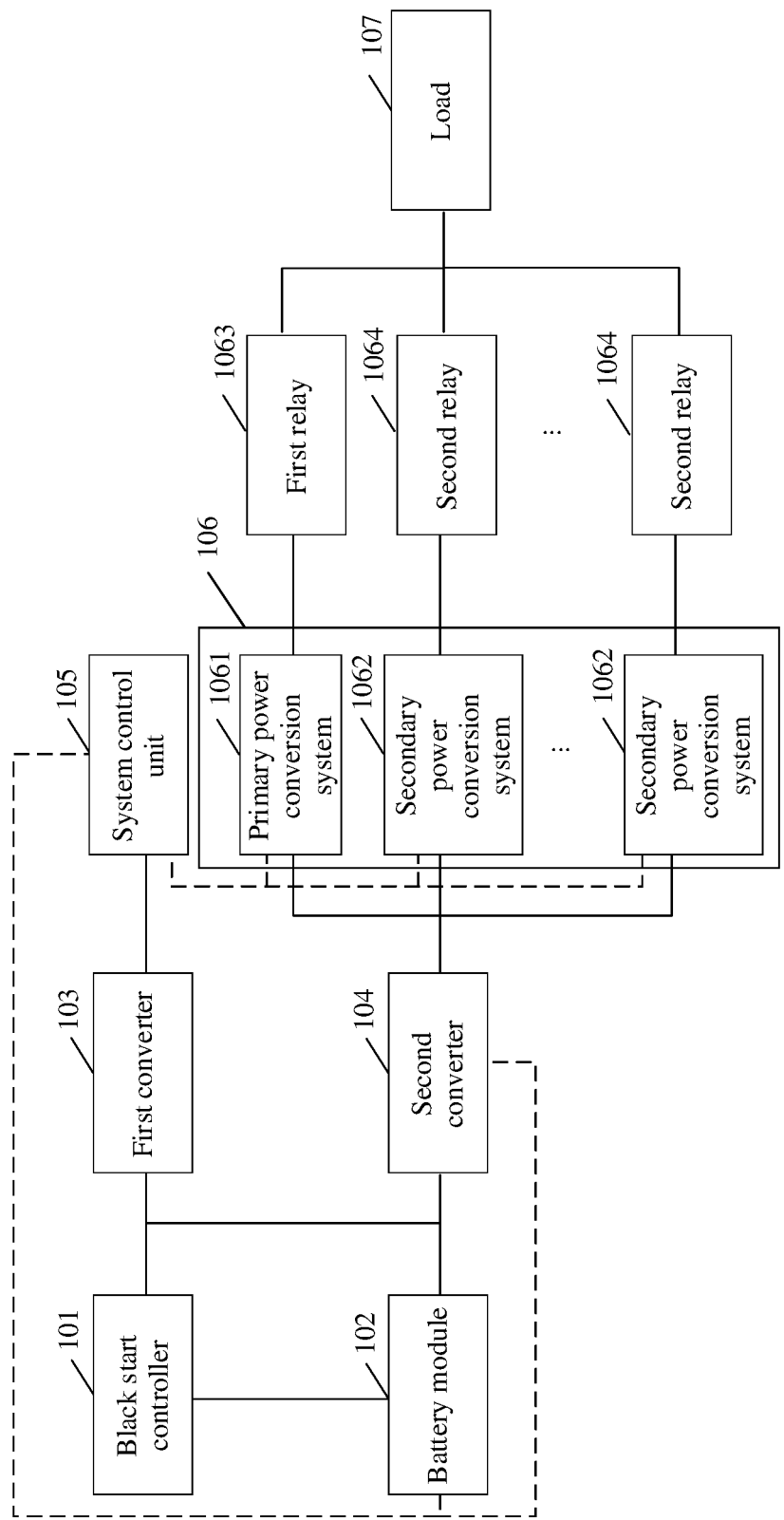
FIG. 2 is a schematic structural diagram of another energy storage system according to an embodiment of this application.

A quantity of PCSs 106 is not limited in this application. As shown in FIG. 2, the PCS 106 includes a primary PCS 1061 and at least one secondary PCS 1062. A method for selecting the primary PCS from the PCSs is not limited in this application. The primary PCS may be specified in advance, or determined based on status information of the PCSs. After the primary PCS is selected, remaining PCSs may be used as the secondary PCSs.

A quantity of loads 107 is not limited in this application. In FIG. 1 and FIG. 2, one load is used as an example for description. A method for supplying power to the load 107 by the PCS 106 is not limited in this application. In a possible example, the primary PCS 1061 is configured to supply, in response to meeting a first preset condition, the power to the load 107 based on the power-on instruction and the bus voltage; and the secondary PCS 1062 is configured to supply, in response to meeting a second preset condition, the power to the load 107 based on the power-on instruction, the bus voltage, and an output voltage of the load 107.

The first preset condition may include that the bus voltage meets a power-on condition, the energy storage system 10 is in an off-grid mode, and the load 107 has no output voltage. The power-on condition may be that an amplitude of a preset bus voltage is greater than a threshold, or a power meets a threshold, or the like. This is not limited herein. It may be understood that when the bus voltage meets the power-on condition, the PCS 106 may be supported to supply the power to the load 107 based on the bus voltage. If the energy storage system 10 is in the off-grid mode and the load 107 has no output voltage, it indicates that the load 107 needs to be powered. Therefore, when the first preset condition is met, the primary PCS 1061 may supply the power to the load 107 based on the power-on instruction and the bus voltage, thereby improving accuracy of black start, and increasing a success rate of the black start.

A method for supplying power to the load 107 by the primary PCS 1061 is not limited in this application. As shown in FIG. 2, the energy storage system 10 further includes a first relay 1063, an input port of the first relay 1063 is connected to an output port of the primary PCS 1061, and an output port of the first relay 1063 is connected to an input port of the load 107. In a possible example, the primary PCS 1061 is specifically configured to: generate an output voltage based on the power-on instruction and the bus voltage; and in response to that the output voltage of the primary PCS 1061 reaches a target value, close the first relay 1063, to supply the power to the load 107.

It may be understood that, after receiving the power-on instruction, the primary PCS 1061 may generate the output voltage based on the bus voltage, that is, perform power conversion on a direct current voltage, to obtain an alternating current voltage with a preset frequency and amplitude required by the load 107. When the amplitude of the alternating current voltage reaches the target value, it indicates that the primary PCS 1061 generates the alternating current voltage that meets a preset requirement, and closes the first relay 1063, to supply the power to the load 107, thereby improving running stability of the load 107.

In this embodiment of this application, the second preset condition may include that the bus voltage meets a power-on condition, the energy storage system 10 is in an off-grid mode, and the output voltage of the load 107 reaches a target value. The target value may be a preset threshold, for example, 220 V. The target value may alternatively be a preset range, for example, 220 V±10%. As described above, when the bus voltage meets the power-on condition, the PCS 106 may be supported to supply the power to the load 107 based on the bus voltage. When the energy storage system 10 is in the off-grid mode, and the output voltage of the load 107 reaches the target value, it indicates that the load 107 stably runs, and may be connected to the secondary PCS 1062, to supply the power to the load 107. That is, when the second preset condition is met, the secondary PCS 1062 may supply the power to the load 107 based on the power-on instruction, the bus voltage, and the output voltage of the load 107, thereby improving accuracy of black start, and increasing a success rate of the black start.

A method for supplying power to the load 107 by the secondary PCS 1062 is not limited in this application. As shown in FIG. 2, the energy storage system 10 further includes at least one second relay 1064, an input port of the second relay 1064 is connected to an output port of the secondary PCS 1062, and an output port of the second relay 1064 is connected to an input port of the load 107. In a possible example, the secondary PCS 1062 is specifically configured to: generate an output voltage based on the power-on instruction and the bus voltage; perform phase-lock processing on the output voltage generated by the secondary PCS 1062 and the output voltage of the load 107; and in response to that a difference between the output voltage of the secondary PCS 1062 and the output voltage of the load 107 is less than a preset threshold, close the second relay 1064, to supply the power to the load 107.

The preset threshold is not limited, and may be 10%, 0.5, or the like. It should be noted that the output voltage of the secondary PCS 1062 and the output voltage of the load 107 may be output voltages at a moment, or may be output voltages determined by combining phases, frequencies, amplitudes, and the like of the output voltages.

It may be understood that, after the primary PCS 1061 first supplies power to the load 107, the load 107 has the output voltage, and then the secondary PCS 1062 supplies power to the load 107 based on the received power-on instruction. In this way, a failure of power supply to the load 107 caused by an excessively large current of the load 107 that is caused when all PCSs 106 are simultaneously started to supply the power to the load 107 may be avoided. In addition, the secondary PCS 1062 specifically generates the output voltage based on the bus voltage, and performs phase-locking processing on the output voltage of the load 107, to obtain an output voltage that is in a same phase as the output voltage of the load 107. When the difference between the output voltage of the secondary PCS 1062 and the output voltage of the load 107 is less than the preset threshold, it indicates that the secondary PCS 1062 may generate an alternating current voltage synchronized with the output voltage of the load 107 and close the second relay 1064, to supply the power to the load 107, thereby further improving operation stability of the load 107.

Figure 3:
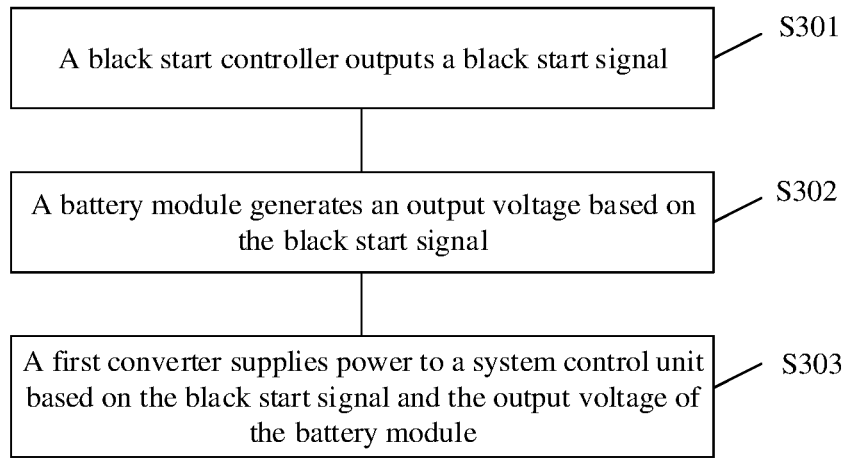
FIG. 3 is a schematic flowchart of a black start method according to an embodiment of this application.

FIG. 3 shows a black start method according to an embodiment of this application. The method is applied to the energy storage system shown in FIG. 1. The method includes but is not limited to the following steps S301 to S303.

S301: The black start controller outputs a black start signal.

S302: The battery module generates an output voltage based on the black start signal.

S303: The first converter supplies power to the system control unit based on the black start signal and the output voltage of the battery module.

In the method described in FIG. 3, after the black start controller outputs the black start signal, the battery module may generate the output voltage based on the black start signal, and the first converter may provide the voltage for the system control unit based on the black start signal output by the black start controller and the output voltage generated by the battery module, to enable the system control unit to implement black start of the energy storage system based on the black start signal. In this way, efficiency of obtaining the black start signal by the system control unit is improved, and a success rate of the black start is increased.

Figure 4:
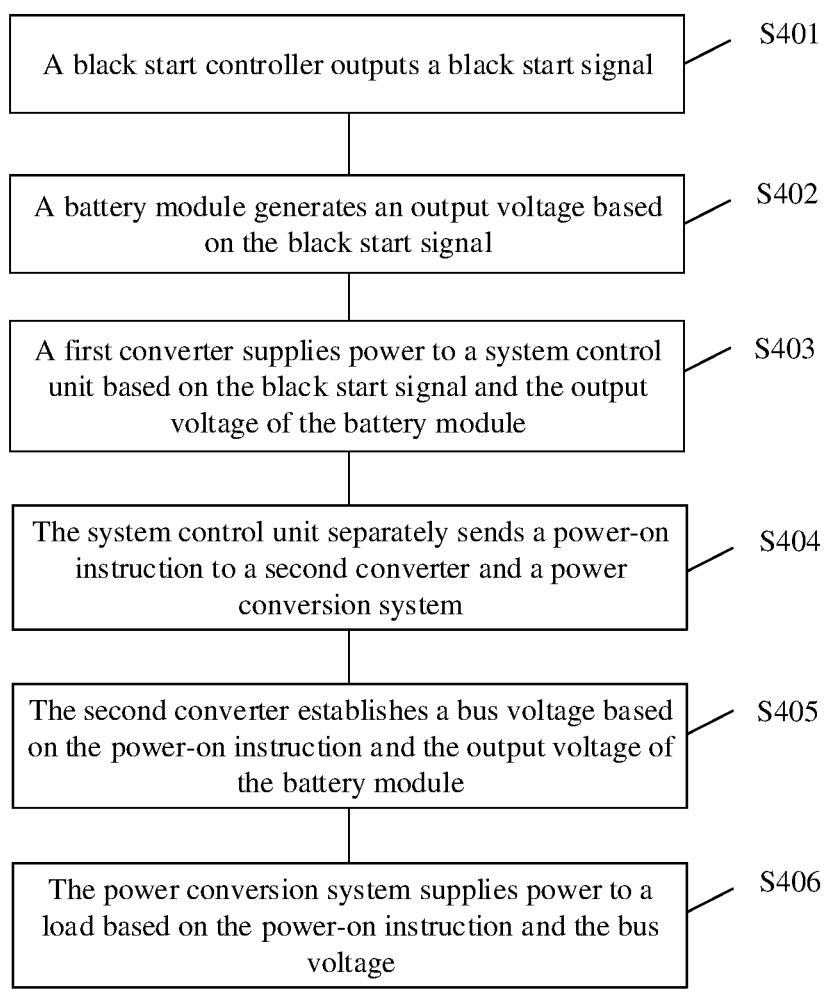
FIG. 4 is a schematic flowchart of another black start method according to an embodiment of this application.

A method for implementing the black start method for the energy storage system by the system control unit is not limited in this application. FIG. 4 shows another black start method according to an embodiment of this application. The method is applied to the energy storage system shown in FIG. 1. The method includes but is not limited to the following steps S401 to S406.

S401: The black start controller outputs a black start signal.

S402: The battery module generates an output voltage based on the black start signal.

S403: The first converter supplies power to the system control unit based on the black start signal and the output voltage of the battery module.

S404: The system control unit separately sends a power-on instruction to the second converter and the power conversion system.

S405: The second converter establishes a bus voltage based on the power-on instruction and the output voltage of the battery module.

S406: The power conversion system supplies power to the load based on the power-on instruction and the bus voltage.

In the method described in FIG. 4, after the first converter provides the voltage for the system control unit based on the black start signal output by the black start controller and the output voltage generated by the battery module, the system control unit may separately send the power-on instruction to the second converter and the power conversion system, so that the second converter establishes, based on the power-on instruction and the output voltage generated by the battery module, the bus voltage used to supply the power to the system, and then the power conversion system supplies power to the load based on the power-on instruction and the bus voltage, thereby implementing black start of the energy storage system.

Figure 5:
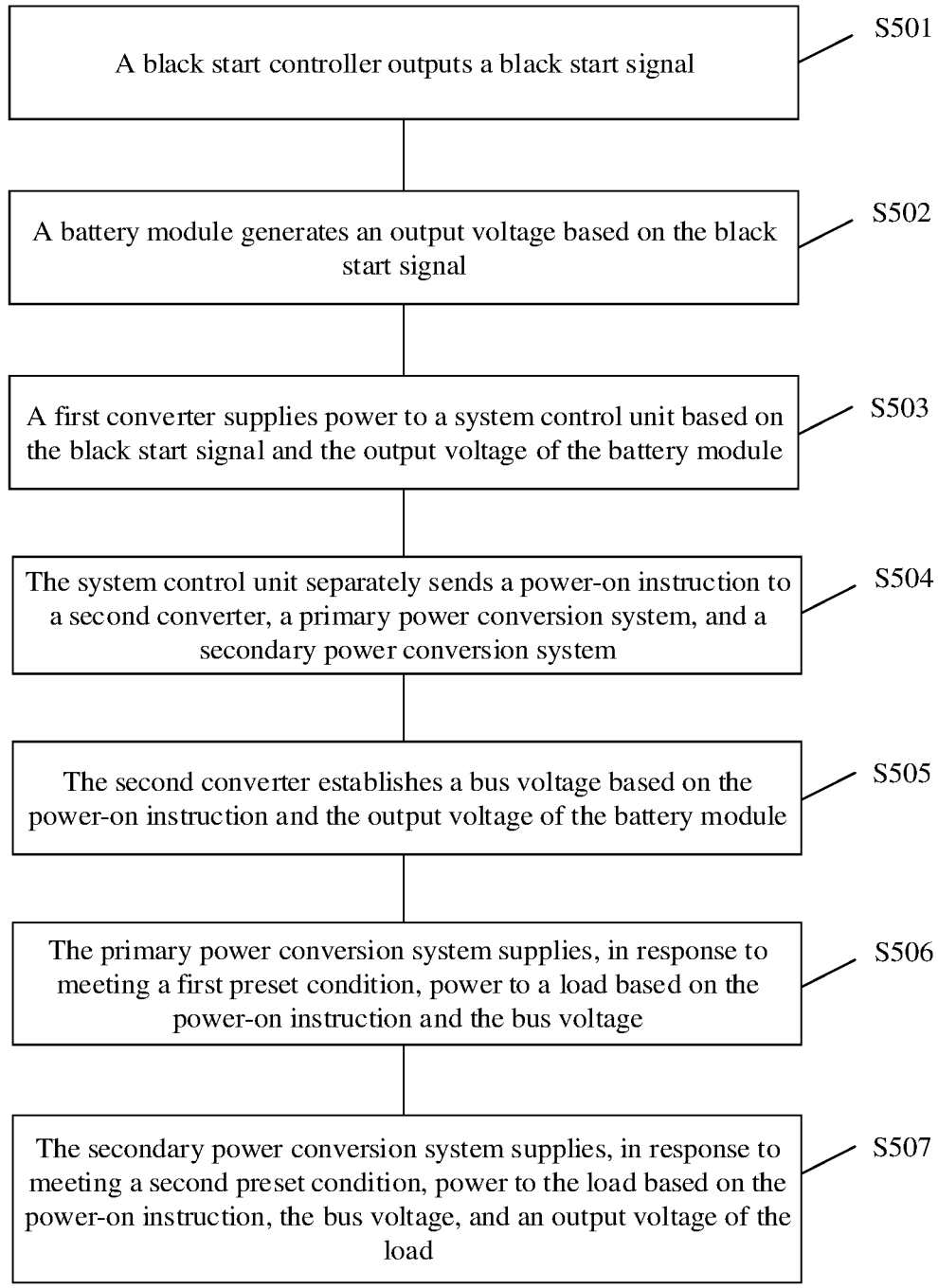
FIG. 5 is a schematic flowchart of another black start method according to an embodiment of this application.

The method for supplying power to the load by the power conversion system is not limited in this application. FIG. 5 shows another black start method according to an embodiment of this application. The method is applied to the energy storage system shown in FIG. 2. The method includes but is not limited to the following steps S501 to S507.

S501: The black start controller outputs a black start signal.

S502: The battery module generates an output voltage based on the black start signal.

S503: The first converter supplies power to the system control unit based on the black start signal and the output voltage of the battery module.

S504: The system control unit separately sends a power-on instruction to the second converter, the primary power conversion system, and the secondary power conversion system.

S505: The second converter establishes a bus voltage based on the power-on instruction and the output voltage of the battery module.

S506: The primary power conversion system supplies, in response to meeting a first preset condition, the power to the load based on the power-on instruction and the bus voltage.

In a possible example, the meeting a first preset condition includes that the bus voltage meets a power-on condition, the energy storage system is in an off-grid mode, and the load has no output voltage.

It may be understood that when the bus voltage meets the power-on condition, the power conversion system may be supported to supply the power to the load based on the bus voltage. If the energy storage system is in the off-grid mode and the load has no output voltage, it indicates that the load needs to be powered. Therefore, when the first preset condition is met, the primary power conversion system may supply the power to the load based on the power-on instruction and the bus voltage, thereby improving accuracy of black start, and increasing a success rate of the black start.

In a possible example, the energy storage system further includes a first relay. That the primary power conversion system supplies the power to the load based on the power-on instruction and the bus voltage includes: The primary power conversion system generates an output voltage based on the power-on instruction and the bus voltage; and in response to that the output voltage of the primary power conversion system reaches a target value, the primary power conversion system closes the first relay, to supply the power to the load.

The target value may be a preset threshold, for example, 220 V. The target value may alternatively be a preset range, for example, 220 V±10%.

It may be understood that, after receiving the power-on instruction, the primary power conversion system may generate the output voltage based on the bus voltage, that is, perform power conversion on a direct current voltage, to obtain an alternating current voltage with a preset frequency and amplitude required by the load. When the amplitude of the alternating current voltage reaches the target value, it indicates that the primary power conversion system generates the alternating current voltage that meets a preset requirement, and closes the first relay, to supply the power to the load, thereby improving running stability of the load.

S507: The secondary power conversion system supplies, in response to meeting a second preset condition, the power to the load based on the power-on instruction, the bus voltage, and an output voltage of the load.

In a possible example, the meeting a second preset condition includes that the bus voltage meets a power-on condition, the energy storage system is in an off-grid mode, and the output voltage of the load reaches a target value.

The target value may be a preset threshold, for example, 220 V. The target value may alternatively be a preset range, for example, 220 V 10%.

It may be understood that when the bus voltage meets the power-on condition, the power conversion system may be supported to supply the power to the load based on the bus voltage. However, when the energy storage system is in the off-grid mode, and the output voltage of the load reaches the target value, it indicates that the load stably runs, and may be connected to the secondary power conversion system, to supply the power to the load. That is, when the second preset condition is met, the secondary power conversion system may supply the power to the load based on the power-on instruction, the bus voltage, and the output voltage of the load, thereby improving accuracy of black start, and increasing a success rate of the black start.

In a possible example, that the secondary power conversion system supplies the power to the load based on the power-on instruction, the bus voltage, and an output voltage of the load includes: The secondary power conversion system generates an output voltage based on the power-on instruction and the bus voltage; the secondary power conversion system performs phase-locking processing on the output voltage of the secondary power conversion system and the output voltage of the load; and in response to that a difference between the output voltage of the secondary power conversion system and the output voltage of the load is less than a preset threshold, the secondary power conversion system supplies the power to the load.

The preset threshold is not limited, and may be 10%, 0.5, or the like.

It may be understood that, after the primary power conversion system first supplies power to the load, the load has the output voltage, and then the secondary power conversion system supplies power to the load based on the received power-on instruction. In this way, a failure of power supply to the load caused by an excessively large current of the load that is caused when all power conversion systems are simultaneously started to supply the power to the load may be avoided. In addition, the secondary power conversion system specifically generates the output voltage based on the bus voltage, and performs phase-lock processing on the output voltage of the load, to obtain an output voltage that is in a same phase as the output voltage of the load. When the difference between the output voltage of the secondary power conversion system and the output voltage of the load is less than the preset threshold, it indicates that the secondary power conversion system may generate an alternating current voltage synchronized with the output voltage of the load and close the second relay, to supply the power to the load, thereby further improving running stability of the load.

In the method described in FIG. 5, after the first converter provides the voltage for the system control unit based on the black start signal output by the black start controller and the output voltage generated by the battery module, the system control unit may separately send the power-on instruction to the second converter, the primary power conversion system, and the secondary power conversion system, so that the second converter establishes, based on the power-on instruction and the output voltage generated by the battery module, the bus voltage used to supply the power to the system. Then, when the first preset condition is met, the primary power conversion system supplies the power to the load based on the power-on instruction and the bus voltage, and then when the second preset condition is met, the secondary power conversion system supplies power to the load based on the power-on instruction, the bus voltage, and the output voltage of the load. In this way, a black start failure caused by an excessively large current of the load that is caused when all power conversion systems in the energy storage system are simultaneously started to supply the power to the load is avoided, and a success rate of the black start is increased.

An embodiment of the present invention further provides a chip system. The chip system includes at least one processor, a memory, and a transceiver. The memory, the transceiver, and the at least one processor are interconnected by using a line, the at least one memory stores an instruction, and when the instruction is executed by the processor, the method procedures shown in FIG. 3 to FIG. 5 are implemented.

An embodiment of the present invention further provides a computer-readable storage medium. The computer-readable storage medium stores an instruction, and when the instruction is run on a network device, the method procedures shown in FIG. 3 to FIG. 5 are implemented.

An embodiment of the present invention further provides a computer program product. When the computer program product runs on a terminal, the method procedures shown in FIG. 3 to FIG. 5 are implemented.

In conclusion, by implementing this embodiment of the present invention, after the black start controller outputs the black start signal, the battery module may generate the output voltage based on the black start signal, and the first converter may provide the voltage for the system control unit based on the black start signal output by the black start controller and the output voltage generated by the battery module, to enable the system control unit to implement black start of the energy storage system based on the black start signal. In this way, efficiency of obtaining the black start signal by the system control unit is improved, and a success rate of the black start is increased.

It may be clearly understood by a person skilled in the art that, for the purpose of convenient and brief description, for a detailed working process of the foregoing apparatus and unit, refer to a corresponding process in the foregoing method embodiments. Details are not described herein again.

In addition, functional units in embodiments of this application may be integrated into one processing unit, each of the units may exist alone physically, or two or more units are integrated into one unit. The integrated unit may be implemented in a form of hardware, or may be implemented in a form of hardware plus a software functional unit.

Embodiments in this specification are all described in a progressive manner, for same or similar parts in embodiments, reference may be made to these embodiments, and each embodiment focuses on a difference from other embodiments. The method disclosed in embodiments corresponds to the apparatus disclosed in embodiments, and therefore is briefly described. For related parts, refer to the description of the apparatus.

It should be noted that, for brief description, the foregoing method embodiments are represented as a series of actions. However, a person skilled in the art should learn that this application is not limited to the described order of the actions, because according to this application, some steps may be performed in other orders or simultaneously.

A sequence of the steps of the method in embodiments of this application may be adjusted, combined, or removed based on an actual requirement.

The implementations of this application may be randomly combined, to achieve different technical effects.

All or some of the foregoing embodiments may be implemented by using software, hardware, firmware, or any combination thereof. When software is used to implement embodiments, all or a part of embodiments may be implemented in a form of a computer program product. The computer program product includes one or more computer instructions. When the computer program instructions are loaded and executed on a computer, the procedure or functions according to this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or a wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a Solid-state Drive), or the like.

In conclusion, the foregoing descriptions are merely embodiments of the technical solutions of the present invention, but are not intended to limit the protection scope of the present invention. Any modification, equivalent replacement, or improvement made according to the disclosure of the present invention shall fall within the protection scope of the present invention.

What is claimed is:
1. A system, comprising:
a black start controller, configured to output a black start signal;
a battery, wherein an input port of the battery is connected to an output port of the black start controller, and the battery is configured to generate an output voltage based on the black start signal;

a first converter, wherein an input port of the first converter is connected to an output port of the battery and the output port of the black start controller, and the first converter is configured to supply, based on the black start signal and the output voltage of the battery, power to a system controller, wherein an input port of the system controller is connected to an output port of the first converter, to enable the system controller to implement black start of the system based on the black start signal;

at least two power conversion systems;

a load connected in parallel to the at least two power conversion systems; and a second converter, wherein an input port of the second converter is connected to the output port of the battery, and an output port of the second converter is connected to an input port of the at least two power conversion systems through at least one direct current bus;

wherein the system controller is configured to separately send a power-on instruction to the second converter and the at least two power conversion systems;

wherein the second converter is configured to establish a bus voltage based on the power-on instruction and the output voltage of the battery;

wherein the at least two power conversion systems are configured to supply power to the load based on the respective power-on instructions and the bus voltage;

wherein the at least two power conversion systems comprise a primary power conversion system and at least one secondary power conversion system; and wherein the primary power conversion system is configured to supply, in response to meeting a first preset condition, the power to the load based on the respective power-on instruction and the bus voltage; and wherein the at least one secondary power conversion system is configured to supply, in response to meeting a second preset condition, the power to the load based on the respective power-on instruction, the bus voltage, and an output voltage of the load.

2. The system according to claim 1, wherein meeting the first preset condition comprises that the bus voltage meets a power-on condition, the system is in an off-grid mode, and the load has no output voltage.

3. The system according to claim 1, wherein meeting the second preset condition comprises that the bus voltage meets a power-on condition, the system is in an off-grid mode, and the output voltage of the load reaches a target value.

4. The system according to claim 1, further comprising a first relay, wherein an input port of the first relay is connected to an output port of the primary power conversion system, an output port of the first relay is connected to an input port of the load, and the primary power conversion system is configured to:

generate an output voltage based on the respective power-on instruction and the bus voltage; and in response to the output voltage of the primary power conversion system reaching a target value, close the first relay, to supply the power to the load.

5. The system according to claim 4, wherein after receiving the respective power-on instruction, the primary power conversion system performs power conversion on a direct current voltage, to obtain an alternating current voltage with a preset frequency and amplitude required by the load; and when the amplitude of the alternating current voltage reaches the target value, the primary power conversion system generates the alternating current voltage that meets a preset requirement, and closes the first relay, to supply the power to the load.

6. The system according to claim 1, further comprising a second relay, wherein an input port of the second relay is connected to an output port of the at least one secondary power conversion system, and an output port of the second relay is connected to an input port of the load, and the at least one secondary power conversion system is configured to:

generate an output voltage based on the respective power-on instruction and the bus voltage;

perform phase-lock processing on the output voltage generated by the at least one secondary power conversion system and the output voltage of the load; and in response to a difference between the output voltage of the at least one secondary power conversion system and the output voltage of the load being less than a preset threshold, close the second relay, to supply the power to the load.

7. The system according to claim 6, wherein after the primary power conversion system first supplies power to the load, the load has the output voltage, and the at least one secondary power conversion system supplies power to the load based on the received power-on instruction.

8. The system according to claim 1, wherein the system controller is communicatively coupled to the black start controller, the battery, the second converter, and each of the at least two power conversion systems.

9. The system according to claim 1, wherein the black start controller, the battery, the first converter, and the second converter are integrated into an energy storage container.

10. The system according to claim 1, wherein the black start controller is a switch.

11. A method, applied to a system comprising a black start controller, a battery, a first converter, a system controller, at least two power conversion systems, a load, and a second converter, the method comprising:

outputting, by the black start controller, a black start signal;

generating, by the battery, an output voltage based on the black start signal;

supplying, by the first converter, power to the system controller based on the black start signal and the output voltage of the battery, to enable the system controller to implement black start of the system based on the black start signal;

separately sending, by the system controller, a power-on instruction to the second converter and the at least two power conversion systems;

establishing, by the second converter, a bus voltage based on the power-on instruction and the output voltage of the battery; and supplying, by the at least two power conversion systems, power to the load based on the respective power-on instructions and the bus voltage;

wherein the at least two power conversion systems comprise a primary power conversion system and at least one secondary power conversion system, and supplying, by the at least two power conversion systems, power to the load based on the respective power-on instructions and the bus voltage comprises:

supplying, by the primary power conversion system in response to meeting a first preset condition, the power to the load based on the respective power-on instruction and the bus voltage; and supplying, by the at least one secondary power conversion system in response to meeting a second preset condition, the power to the load based on the respective power-on instruction, the bus voltage, and an output voltage of the load.

12. The method according to claim 11, wherein meeting the first preset condition comprises that the bus voltage meets a power-on condition, the system is in an off-grid mode, and the load has no output voltage.

13. The method according to claim 11, wherein meeting the second preset condition comprises that the bus voltage meets a power-on condition, the system is in an off-grid mode, and the output voltage of the load reaches a target value.

14. The method according to claim 11, wherein the system further comprises a first relay, and supplying, by the primary power conversion system, the power to the load based on the respective power-on instruction and the bus voltage comprises:

generating, by the primary power conversion system, an output voltage based on the respective power-on instruction and the bus voltage; and in response to the output voltage of the primary power conversion system reaching a target value, closing the first relay by the primary power conversion system, to supply the power to the load.

15. The method according to claim 14, wherein after receiving the respective power-on instruction, the primary power conversion system performs power conversion on a direct current voltage, to obtain an alternating current voltage with a preset frequency and amplitude required by the load, and when the amplitude of the alternating current voltage reaches the target value, the primary power conversion system generates the alternating current voltage that meets a preset requirement, and closes the first relay, to supply the power to the load.

16. The method according to claim 11, wherein supplying, by the at least one secondary power conversion system, the power to the load based on the power-on instruction, the bus voltage, and the output voltage of the load comprises:

generating, by the at least one secondary power conversion system, an output voltage based on the respective power-on instruction and the bus voltage;

performing, by the at least one secondary power conversion system, phase-locking processing on the output voltage of the at least one secondary power conversion system and the output voltage of the load; and in response to a difference between the output voltage of the at least one secondary power conversion system and the output voltage of the load being less than a preset threshold, supplying, by the at least one secondary power conversion system, the power to the load.

17. The method according to claim 16, wherein the system further comprises a second relay, an input port of the second relay is connected to an output port of the at least one secondary power conversion system and an output port of the second relay is connected to an input port of the load.

18. The method according to claim 17, wherein after the primary power conversion system first supplies power to the load, the load has the output voltage, and then the at least one secondary power conversion system supplies power to the load based on the received power-on instruction.

19. The method according to claim 18, wherein when the difference between the output voltage of the at least one secondary power conversion system and the output voltage of the load is less than the preset threshold, the at least one secondary power conversion system generates an alternating current voltage synchronized with the output voltage of the load and closes the second relay, to supply the power to the load.

20. The method according to claim 11, wherein the black start controller is a switch.

* * * * *